US012039291B2

(12) United States Patent
Shimoyama

(10) Patent No.: US 12,039,291 B2
(45) Date of Patent: Jul. 16, 2024

(54) ABNORMALITY DETECTION CIRCUIT AND METHOD OF DETECTING AN ABNORMALITY

(71) Applicant: SANKEN ELECTRIC CO., LTD., Niiza (JP)

(72) Inventor: Naohiko Shimoyama, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 12 days.

(21) Appl. No.: 17/860,142

(22) Filed: Jul. 8, 2022

(65) Prior Publication Data

US 2022/0342665 A1 Oct. 27, 2022

Related U.S. Application Data

(63) Continuation of application No. PCT/JP2020/008006, filed on Feb. 27, 2020.

(51) Int. Cl.
*G06F 11/00* (2006.01)
*G06F 7/58* (2006.01)
*G06F 11/07* (2006.01)

(52) U.S. Cl.
CPC .......... *G06F 7/588* (2013.01); *G06F 11/0757* (2013.01)

(58) Field of Classification Search
CPC .. G06F 11/0757; G06F 11/0754; G06F 11/28; G06F 7/58; G06F 7/582; G06F 7/588
See application file for complete search history.

(56) References Cited

U.S. PATENT DOCUMENTS 6,654,905 B1 * 11/2003 Dickens .................. G06F 11/28
714/36
2009/0118881 A1 * 5/2009 West ...................... B60W 20/11
701/22

FOREIGN PATENT DOCUMENTS

| JP | H01-147643 A | 6/1989 |
| JP | H11-289324 A | 10/1999 |
| JP | H11-306047 A | 11/1999 |
| JP | 2003-218850 A | 7/2003 |

(Continued)

OTHER PUBLICATIONS

Mcu operation monitoring system and controlling method thereof (machine translation of KR101988723—cited in PCT), 2017, Google Patents (Year: 2017).*

(Continued)

*Primary Examiner* — Marc Duncan
(74) *Attorney, Agent, or Firm* — METROLEX IP LAW GROUP, PLLC

(57) ABSTRACT

An abnormality detection circuit and method of detecting an abnormality in a CPU is disclosed that may include counting a count value from an initial value to a timeout value; storing a seed value readable from the CPU; generating a key value for verification by performing a specified arithmetic processing on the seed value; waiting for a key value to be written by the CPU; comparing the key value written by the CPU with the key value for verification; and when the count value is equal to the timeout value without the counter being reset, in response to the key value and the key value for verification matching, resetting the counter and storing the seed value to be determined at the time of resetting the counter in the seed value storage section.

21 Claims, 6 Drawing Sheets

(56) References Cited

FOREIGN PATENT DOCUMENTS

| JP | 2015-133573 A | 7/2015 |
| KR | 10-2019-0014387 A | 2/2019 |

OTHER PUBLICATIONS

The International Search Report of PCT/JP2020/008006 mailed on May 19, 2020.

* cited by examiner

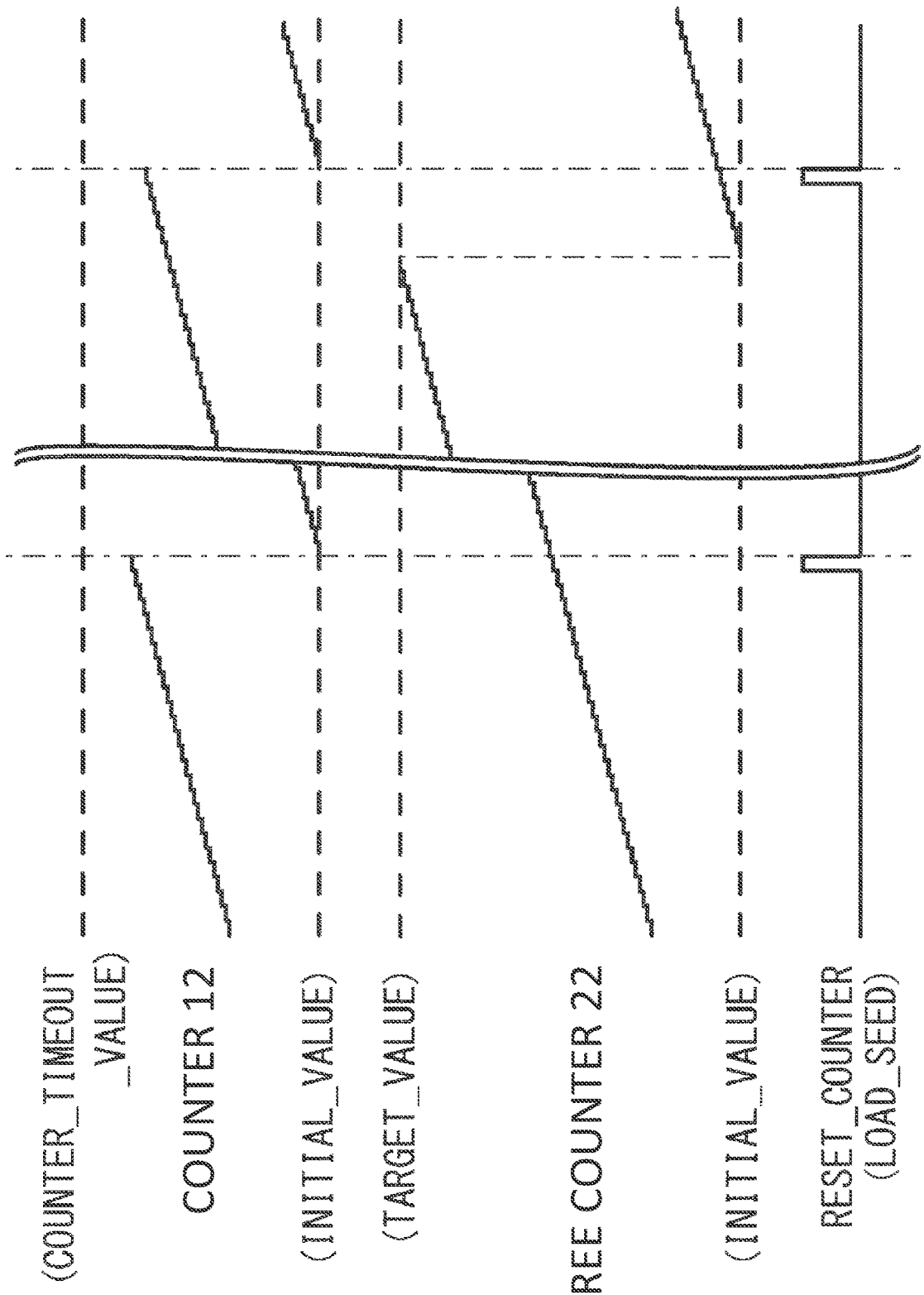

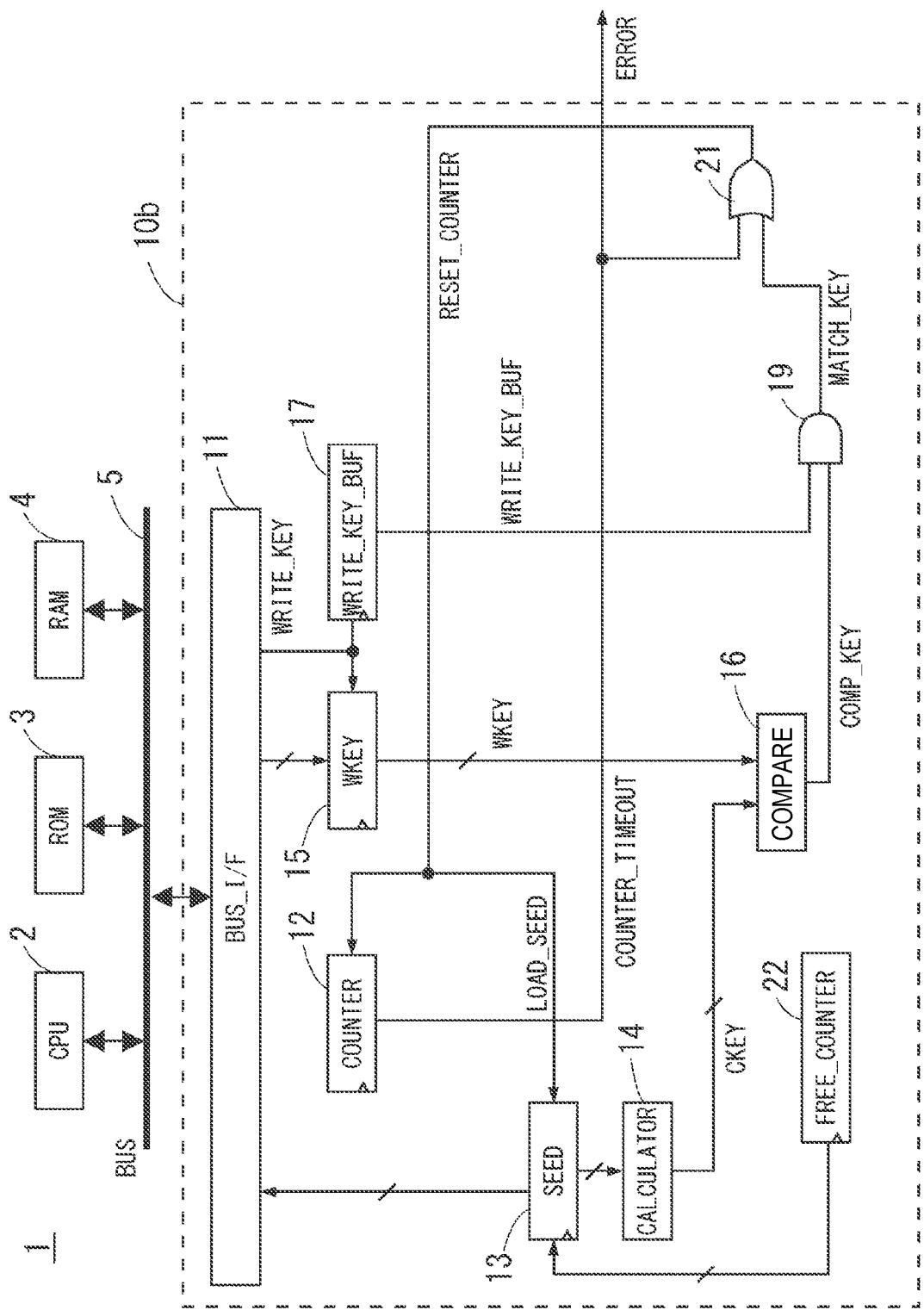

ABNORMALITY DETECTION CIRCUIT AND METHOD OF DETECTING AN ABNORMALITY

CROSS REFERENCE TO RELATED APPLICATIONS

This application is a continuation application of International Application No. PCT/JP2020/008006, filed on Feb. 27, 2020, the entire contents of which are incorporated herein by reference.

BACKGROUND

The disclosure relates to an abnormality detection circuit and a method of detecting an abnormality in a CPU.

A watchdog timer is known as an abnormality detection circuit for detecting an abnormality of a CPU. The watchdog timer detects an abnormality of the CPU when a count value reaches (e.g. is equal to) a set timeout value without a count being reset by the CPU.

A key value is proposed to be used when resetting the counter by the CPU (see Patent Documents 1 and 2, for example). In Japanese Patent Publication No. H01-147643 (Patent Document 1), a value obtained by performing an arithmetic processing on a value of the key value used for resetting is used as the next key value to be used. Also, in Japanese Patent Publication No. H11-306047 (Patent Document 2), a counter value of the counter is used as the next key value to be used.

The related art disclosed in the Patent Document 1 satisfies the function of logical monitoring as a function of monitoring a program sequence. However, the key value is a repeated value having a fixed cycle, and once the previous key is determined, the next key is uniquely determined. Therefore, the next key does not change according to the operating status of the program sequence, and the function of monitoring the program sequence is weak.

In the related art disclosed in the Patent Document 2, the key value differs depending on the timing of reading the count value, so that randomness is obtained depending on the operating status of the program sequence. However, since a read value is used as a key value as it is, there is no logical procedure processing, and therefore, the monitoring function that performs logical monitoring of the program sequence is insufficient. In addition, a read count value is set as a key value as it is. Therefore, if another bus master, such as a debugger, etc., reads the register before the CPU writes a read count value as a key value, the key value changes and the counter of the watchdog timer is not reset.

SUMMARY

An abnormality detection circuit according to one or more embodiments may include a counter that counts from an initial value to a timeout value, and may detect an abnormality of a CPU when a count value is equal to the timeout value without the counter being reset. The abnormality detection circuit may include a seed value storage section that stores a seed value readable from the CPU, a calculator that generates a key value for verification by performing a specified arithmetic processing on the seed value stored in the seed value storage section, a key value storage section that a key value is written by the CPU, and a comparator that compares the key value written in the key value storage section with the key value for verification. When the key value written in the key value storage section and the key value for verification match, the counter is reset and the seed value to be determined at the time of resetting the counter is stored in the seed value storage section. A method of detecting an abnormality according to one or more embodiments may include counting from the initial value to the timeout value by the counter and detecting an abnormality of the CPU when a count value is equal to the timeout value without the counter being reset. A seed value is stored in the seed value storage section to be readable from the CPU. A key value for verification is generated by performing the specified arithmetic processing on the seed value stored in the seed value storage section by the calculator. A key value is waited to be written in the key value storage section by the CPU. The key value written in the key value storage section is compared with the key value for verification by the comparator. When the key value written to the key value storage section matches the key value for verification, the counter is reset and the seed value to be determined at the time of resetting the counter is stored in the seed value storage section.

BRIEF DESCRIPTION OF DRAWINGS

FIG. 5 is a timing chart illustrating a counting operation of a free counter, such as is illustrated in FIG. 4, for example; and FIG. 6 is a block diagram illustrating another configuration example of an abnormality detection circuit, such as is illustrated in FIG. 1, for example.

DETAILED DESCRIPTION

An abnormality detection circuit and a method of detecting an abnormality according to one or more embodiments are described below with reference to drawings.

Figure 1:
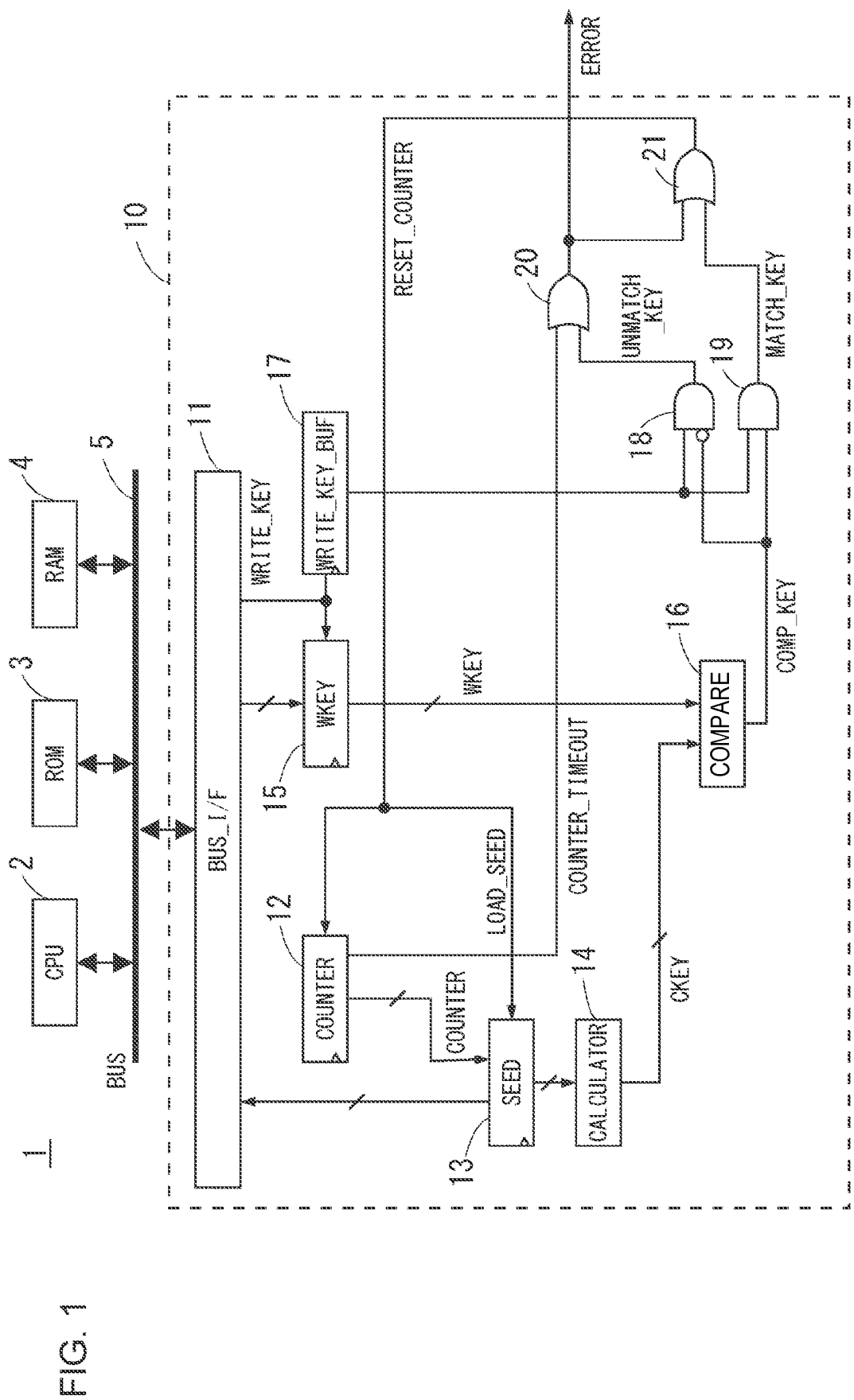
FIG. 1 is a block diagram illustrating a configuration of a microcomputer incorporating an abnormality detection circuit according to one or more embodiments.

An abnormality detection circuit 10 illustrated in FIG. 1 is built into a microcomputer 1, which includes a CPU 2 that executes a program, a ROM 3 that stores the program executed by the CPU 2, a RAM 4 that serves as a work area of the CPU 2, etc. The microcomputer 1 may be formed on a single semiconductor chip.

The abnormality detection circuit 10 is a so-called watchdog timer that detects an abnormality of the CPU 2 when a set count value is reached, and is connected to the CPU 2 via an internal bus (BUS) 5. The abnormality detection circuit 10 may be formed not to reset a count by the CPU 2.

The abnormality detection circuit 10 includes a bus interface (BUS_I/F) 11, a counter (COUNTER) 12, a seed value register (SEED) 13, a calculator (CALCULATOR) 14, a write key register (WKEY) 15, a comparator (COMPARE) 16, a buffer (WRITE_KEY_BUF) 17, a first AND circuit 18, a second AND circuit 19, a first OR circuit 20, and a second OR circuit 21.

The counter 12 counts from an initial value (INITIAL_VALUE) by a predetermined clock, and when a count value reaches a set timeout value (TIMEOUT_VALUE), the counter 12 outputs a count timeout signal (COUNTER_TIMEOUT).

When a reset counter signal (RESET_COUNTER) is input to the counter 12, the counter 12 resets a count value to the initial value and starts a new count. The reset counter signal (RESET_COUNTER) is also input to the seed value register 13 as a seed value read signal (LOAD_SEED), and the seed value register 13 stores the count value of the counter 12 before reset as a seed value (SEED).

The seed value register 13 is configured to be read accessible via the bus interface 11. The CPU 2 reads the seed value stored in the seed value register 13 before the count value of the counter 12 reaches the timeout value.

A seed value is stored in the seed value register 13 as a count value when the counter 12 is reset. Therefore, a seed value changes depending on an operating condition of a program sequence. In addition, since read access to the seed value register 13 does not cause reading from the counter 12, a seed value does not change even if read access to the seed value register 13 by other bus master, etc. occurs.

The calculator 14 generates a key value (CKEY) by performing a specified arithmetic processing on the seed value stored in the seed value register 13. The specified arithmetic processing performed by the calculator 14 applies an arithmetic processing whereby a key value generated from a seed value may not be generated from any other seed value. In other words, the specified arithmetic processing is an arithmetic processing in which the mapping from a seed value set to a key value set is a bijection (e.g. a one-to-one mapping) in terms of the relationship between the seed value set of possible values as the seed values and the key value set of possible values as the key values. Therefore, since the same key value does not exist for different seed values, key values generated from different seed values are not valid, and thus the effectiveness of the logical monitoring function improves.

In the specified arithmetic processing, a bit width of the key value is set to be greater than or equal to the bit width of the seed value because the seed value corresponds one-to-one to the key value. In other words, if the bit width of the key value is less than the bit width of the seed value, the same key may be generated from different seeds. Furthermore, in the specified arithmetic processing, all bits of the seed value are set to be used in the operation and there are no unused bits.

The specified arithmetic processing may be preferable to be a combination of multiple operations, so that the individual operations maintain a bijective relation. If the count value and the key value (CKEY) of the counter 12 are 32 bits wide, for example, the following formula (1), which is a combination of a bit swapping, an addition of fixed values (deletion of carries that exceed the bit width of the key value), and a bit inversion (exclusive OR of fixed values), may be applied as the specified arithmetic processing:

$$CKEY[31:0]=(\{SEED[7:0],SEED[31:8]\}+ 0x85C421FE)\char`\^0x3486A8D7 \quad (1)$$

The write key register 15 is configured to be write accessible via the bus interface 11. The CPU 2 performs the same specified arithmetic processing as that of the calculator 14 to the seed value read from the seed value register 13 to generate a key value (WKEY), outputs a write signal (WRITE_KEY) to the write key register 15, and thus writes the generated key value (WKEY) in the write key register 15 before the count value of the counter 12 reaches the timeout value.

The comparator 16 compares the key value calculated by the calculator 14 (CKEY) with the key value written in the write key register 15 (WKEY), and outputs a comparison signal (COMP_KEY) that becomes HIGH when the CKEY and WKEY match and becomes LOW when the CKEY and WKEY do not match.

The write signal (WRITE_KEY) is input to one input terminal of the first AND circuit 18 as the write buffer signal (WRITE_KEY_BUF) delayed by one clock cycle through the buffer 17. The comparison signal (COMP_KEY) output from the comparator 16 is input to the other inverting input terminal of the first AND circuit 18. As a result, when a key value (WKEY) written into the write key register 15 according to a write signal (WRITE_KEY) does not match a key value (CKEY) calculated by the calculator 14, a mismatch signal (UNMATCH_KEY) is output from an output terminal of the first AND circuit 18.

The write signal (WRITE_KEY) to the write key register 15 is input to one input terminal of the second AND circuit 19 as the write buffer signal (WRITE_KEY_BUF) delayed by one clock cycle through the buffer 17. The comparison signal (COMP_KEY) output from the comparator 16 is input to the other input terminal of the second AND circuit 19. As a result, when the key value (WKEY) written into the write key register 15 along with the write signal (WRITE_KEY) matches the key value (CKEY) calculated by the calculator 14, a match signal (MATCH_KEY) is output from an output terminal of the second AND circuit 19.

The count timeout signal (COUNTER_TIMEOUT) output from the counter 12 is input to one input terminal of the first OR circuit 20. The mismatch signal (UNMATCH_KEY) output from the first AND circuit 18 is input to the other input terminal of the first OR circuit 20. Thereby, when either or both of the count timeout signal (COUNTER_TIMEOUT) and the mismatch signal (UNMATCH_KEY) are input to the first OR circuit 20, an error signal (ERROR) detecting an abnormality of the CPU 2 is output from an output terminal of the first OR circuit 20.

The error signal (ERROR) output from the first OR circuit 20 is input to one input terminal of the second OR circuit 21. The match signal (MATCH_KEY) output from the second AND circuit 19 is input to the other input terminal of the second OR circuit 21. When either or both of the error signal (ERROR) and the match signal (MATCH_KEY) are input to the second OR circuit 21, a reset counter signal (RESET_COUNTER) is output from an output terminal of the second OR circuit 21.

Figure 2:
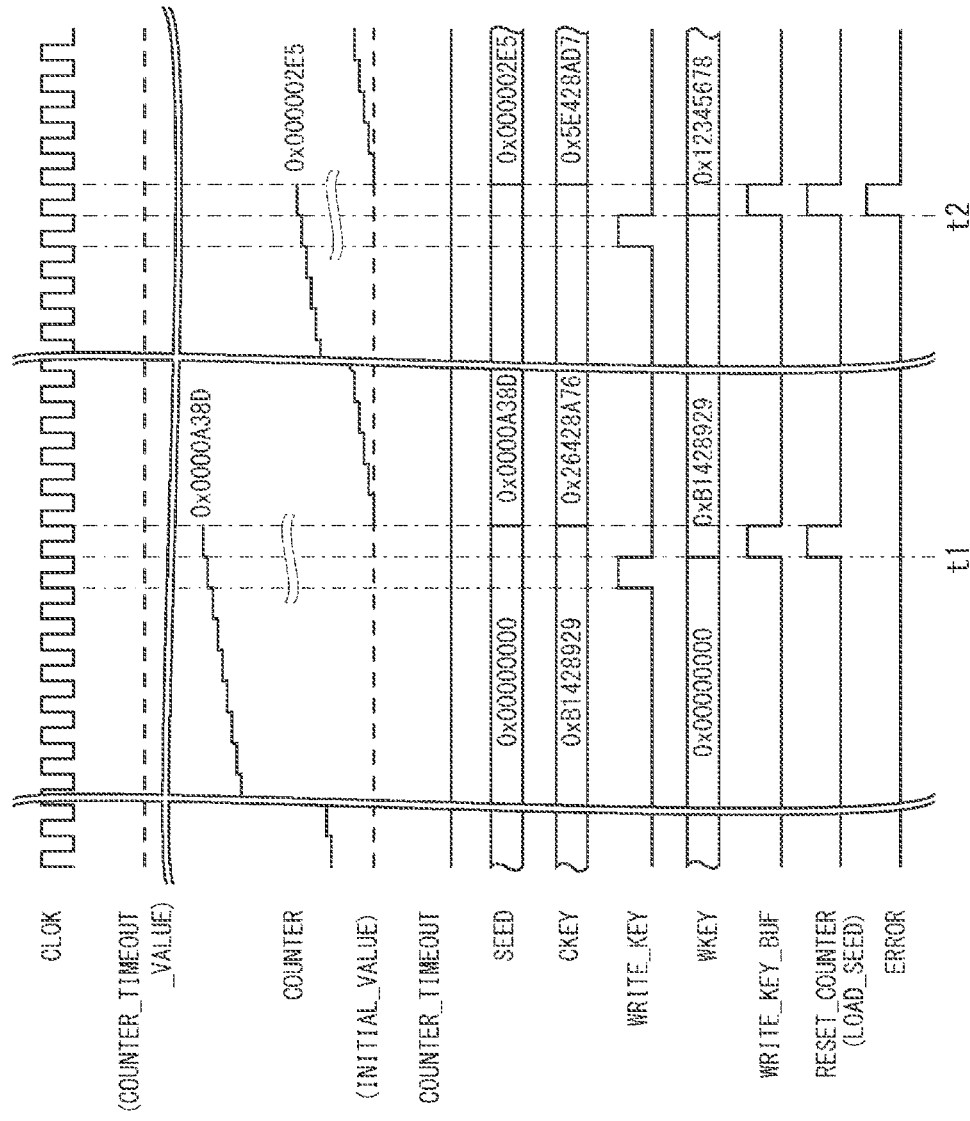
FIG. 2 is a timing chart illustrating operations of an abnormality detection circuit, such as is illustrated in FIG. 1, in matching and mismatching cases, for example.

An operation of the abnormality detection circuit 10 in an event of matching is described with reference to FIG. 2. A key value (WKEY: 0xB1428929) is written to the write key register 15 at time t1 in accordance with the write signal (WRITE_KEY) from the CPU 2. The comparator 16 compares a key value (CKEY: 0xB1428929), which is generated by performing the specified processing on a seed value (SEED: 0x 00000000) stored in the seed value register 13 by the calculator 14, with the key value (WKEY: 0xB1428929), which is written to the write key register 15.

The key value (CKEY: 0xB1428929) and the key value (WKEY: 0xB1428929) match, and the comparison signal (COMP_KEY) from the comparator 16 becomes HIGH, so that the write buffer signal (WRITE_KEY_BUF) is output from the output terminal of the second AND circuit 19 as the match signal (MATCH_KEY). The match signal (MATCH_KEY) is output from the output terminal of the second OR circuit 21 as the reset counter signal (RESET_COUNTER) and the seed value read signal (LOAD_SEED). As a result, the counter 12 resets the count value to the initial value and starts a new count, and a count value (0x0000A38D) before the reset of the counter 12 is saved in the seed value register 13 as a seed value (SEED: 0x0000A38D).

The CPU 2 may conduct a sequence of operations, which is to read the seed value from the seed value register 13, to perform the specified arithmetic processing for the different seed value each time, and to write the key value to the write key register 15, before the count value of the counter 12 reaches the timeout value. The specified arithmetic processing for the seed value is successfully performed. Therefore, the program sequence in the CPU 2 is verified to function properly in time and logically.

An operation of the abnormality detection circuit 10 in an event of mismatching is described with reference to FIG. 2. A key value (WKEY: 0x12345678) is written to the write key register 15 at time t2 in accordance with the write signal (WRITE_KEY) from the CPU 2. The comparator 16 compares a key value (CKEY: 0x26428A76), which is generated by performing the specified processing on the seed value (SEED: 0x0000A38D) stored in the seed value register 13 by the calculator 14, with the key value (WKEY: 0x12345678), which is written to the write key register 15.

The key value (CKEY: 0x26428A76) and the key value (WKEY: 0x12345678) mismatch, and the comparison signal (COMP_KEY) from the comparator 16 becomes LOW, so that the write buffer signal (WRITE_KEY_BUF) is output from the output terminal of the first AND circuit 18 as the mismatch signal (UNMATCH_KEY). The mismatch signal (UNMATCH_KEY) is output from the output terminal of the first OR circuit 20 as an error signal (ERROR) and is output from the output terminal of the second OR circuit 21 as the reset counter signal (RESET_COUNTER) and the seed value read signal (LOAD_SEED). As a result, the counter 12 resets the count value to the initial value and starts a new count, and a count value (0x000002E5) before the reset of the counter 12 is saved in the seed value register 13 as a seed value (SEED: 0x000002E5).

The CPU 2 may conduct a sequence of operations, which is to read the seed value from the seed value register 13, to perform the specified arithmetic processing for the different seed value each time, and to write the key value to the write key register 15, before the count value of the counter 12 reaches the timeout value. However, the specified arithmetic processing for the seed value may not be performed properly. Therefore, the program sequence in the CPU 2 is detected to be logically abnormal.

Figure 3:
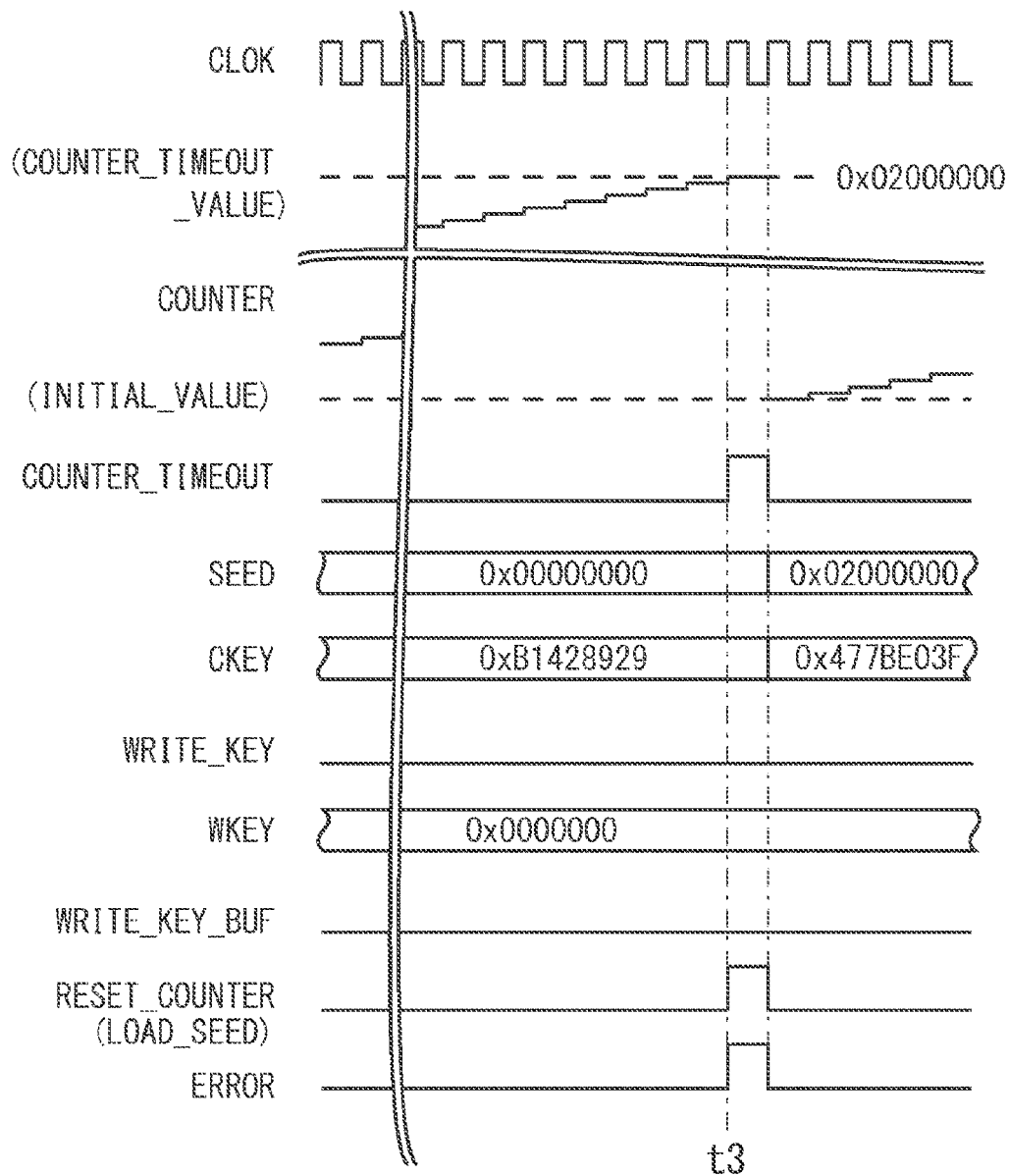
FIG. 3 is a timing chart illustrating an operation of an abnormality detection circuit, such as is illustrated in FIG. 1, at the time of a timeout, for example.

An operation of the abnormality detection circuit 10 in an event of a timeout is described with reference to FIG. 3. When the count value reaches a set timeout value (TIMEOUT_VALUE) at time t3 without the write signal (WRITE_KEY) from the CPU 2 being input, the counter 12 outputs a count timeout signal (COUNTER_TIMEOUT).

The count timeout signal (COUNTER_TIMEOUT) is output from the output terminal of the first OR circuit 20 as the error signal (ERROR) and is also output from the output terminal of the second OR circuit 21 as the reset counter signal (RESET_COUNTER) and the seed value read signal (LOAD_SEED). As a result, the counter 12 resets the count value to the initial value and starts a new count, and a count value (0x02000000) before the reset of the counter 12 is stored in the seed value register 13 as a seed value (SEED: 0x02000000).

The CPU 2 may not execute a sequence of operations, which is to read the seed value from the seed value register 13, to perform the specified arithmetic processing on the different seed value each time, and to write the key value to the write key register 15, before the count value of the counter 12 reaches the timeout value. Therefore, the program sequence in the CPU 2 is detected to be abnormal in time.

Figure 4:
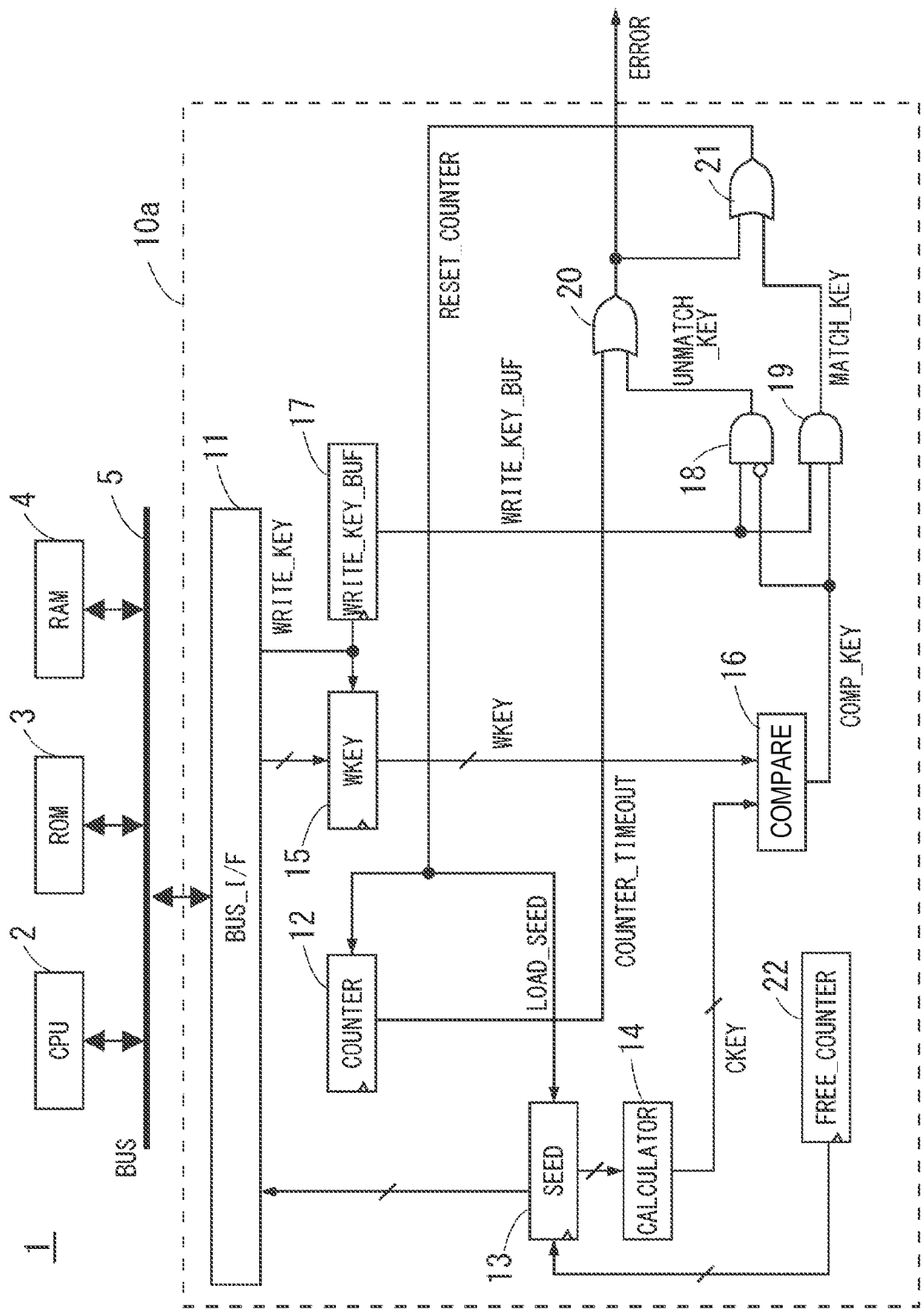
FIG. 4 is a block diagram illustrating another configuration example of an abnormality detection circuit, such as is illustrated in FIG. 1, for example.

An abnormality detection circuit 10a illustrated in FIG. 4 includes a free counter 22 different from the counter 12 and is configured to store a count value of the free counter 22 as a seed value (SEED) when a seed value read signal (LOAD_SEED) is input to the seed value register 13.

As illustrated in FIG. 5, the free counter 22 counts sequentially between an initial value (INITIAL_VALUE) and a target value (TARGET_VALUE) based on a predetermined clock signal without being reset by a reset counter signal (RESET_COUNTER) to reset the counter 12. In the example, the seed value (SEED) for each program sequence may be reliably set to a different value, although in one or more embodiments, a configuration called the free counter 22 is added. In other words, when the CPU 2 executes a sequence of operations at the same timing, a count value before the reset of the counter 12, which is reset by the reset counter signal (RESET_COUNTER), may be the same as a count value after the reset of the counter 12. In contrast, since the free counter 22 is not reset by the reset counter signal (RESET_COUNTER), a count value at the time of reset becomes a different value even if the CPU 2 executes a sequence of operations at the same timing. The count value between the initial value (INITIAL_VALUE) and the target value (TARGET_VALUE) in the free counter 22 is preferably set to a sufficiently large value, and the set value is preferably the same as the count value between the initial value (INITIAL_VALUE) and the timeout value (TIMEOUT_VALUE) in the counter 12 or larger.

A random number generator may also be included instead of the free counter 22. When the seed value read signal (LOAD_SEED) is input to the seed value register 13, the random number generated by the random number generator may be stored as the seed value (SEED).

When there is an external circuit that functions as the free counter 22 or a random number generator, a count value or random number of the external circuit may be saved as the seed value (SEED) after the seed value read signal (LOAD_SEED) is input to the seed value register 13.

In an abnormality detection circuit 10b illustrated in FIG. 6, the first AND circuit 18 and the first OR circuit 20 are omitted, and the error signal (ERROR) and the reset counter signal (RESET_COUNTER) are not output even if the key value (WKEY) and the key value (CKEY) are mismatched. Accordingly, the count timeout signal (COUNTER_TIMEOUT) is output and the error signal (ERROR) is output only when the count value of the counter 12 reaches the timeout value (TIMEOUT_VALUE).

As described above, one or more embodiments include the counter 12 that counts in counting increments from the initial value to or towards the timeout value, and include the abnormality detection circuit 10 for detecting an abnormality of the CPU 2 when the count value reaches the timeout value without the counter 12 being reset. The abnormality detection circuit 10 includes the seed value register 13, which is a seed value storage section that stores a seed value (SEED) readable from the CPU 2, the calculator 14, which generates a key value (CKEY) for verification by performing the specified arithmetic processing on the seed value stored in the seed value register 13, the write key register 15, which is a key value storage section into which a key value (WKEY) is written by the CPU 2, and the comparator 16, which compares the key value (WKEY) written to the write key register 15 with the key value (CKEY) for verification. When the key value (WKEY) written to the write key register 15 and the key value (CKEY) for verification match, the counter 12 is reset, and the seed value (SEED) to be determined at the time of resetting the counter 12 is stored in the seed value register 13.

With the configuration, the CPU 2 may be required to execute a sequence of operations, which is to read the seed value from the seed value register 13, to perform the specified arithmetic processing on the different seed value each time, and to write the key value to the write key register 15, before the count value of the counter 12 reaches the timeout value. Therefore, the program sequence may be monitored in time and logically.

According to one or more embodiments, the specified arithmetic processing performed by the calculator 14 is that the mapping from the seed value set to the key value set is a bijection in terms of the relationship between the seed value set of possible values as the seed value (SEED) and the key value set of possible values as the key value for verification (CKEY).

The configuration ensures that the key value (WKEY) and the key value for verification (CKEY) do not match due to different arithmetic processing, and thus the logical monitoring of the program sequence may be performed accurately.

According to one or more embodiments, the specified arithmetic processing performed by the calculator 14 includes bit swapping. The use of a configuration involving bit swapping allows the logical monitoring of the program sequence to be performed accurately because the process is more complicated in software than in hardware.

According to one or more embodiments, the count value at the time of resetting the counter 12 is stored in the seed value register 13 as a seed value (SEED). The use of such a configuration allows the count value at the time of resetting the counter 12 to be used as the seed value (SEED) without installing a new circuit for determining the seed value.

In one or more embodiments, the free counter 22 that is not reset when the key value (WKEY) written to the write key register 15, matches the key value for verification (CKEY). The count value of the free counter 22 at the time of resetting the counter 12 is stored in the seed value register 13 as a seed value (SEED). With the above described configuration, even if the CPU 2 executes a sequence of operations at the same timing, the count values at reset are different values, and the logical monitoring of the program sequence may be accurately performed.

One or more embodiments include a random number generator, and a random number generated by the random number generator at the time of resetting the counter 12, which is stored in the seed value register 13 as a seed value (SEED). With the above described configuration, even if the CPU 2 executes a sequence of operations at the same timing, the count values at reset are different values, and the logical monitoring of the program sequence may be accurately performed.

According to one or more embodiments, a value determined by an external circuit at the time of resetting the counter 12 is stored in the seed value register 13 as a seed value (SEED). The above described configuration allows the value determined by an external circuit to be used as the seed value (SEED) without installing a circuit to determine the seed value in the circuit.

According to one or more embodiments, when the key value (WKEY) written to the write key register 15 and the key value for verification (CKEY) do not match, counting is continued without resetting the counter 12. With the above described configuration, the error signal (ERROR) is output only when the count value of the counter 12 reaches the timeout value (TIMEOUT_VALUE), and the logic of error detection may be unified.

In an abnormality detection circuit and an abnormality detection method according to one or more embodiments, the CPU performs a sequence of operations including reading a seed value, performing a specified arithmetic processing on the seed value that differs each time, and writing a key value before the count value reaches the timeout value. Therefore, the program sequence may be monitored in time and logically.

As described above, the abnormality detection circuit and the method of detecting an abnormality according to one or more embodiments may monitor a program sequence in time and logically.

The invention is not limited to one or more embodiments described above, and each embodiment may be changed as appropriate within the scope of the technical concept of the invention. The number, position, shape, etc., of elements are not limited to the one or more embodiments described above, and can be made according to any number, position, shape, etc., that is suitable for implementing embodiments within the scope of the invention. Note that in the respective drawings, the same constituents are designated by the same symbols.

The invention claimed is:

1. An abnormality detection circuit that detects an abnormality of a CPU, comprising:
   a counter that counts a count value from an initial value to a timeout value;
   a seed value storage section that stores a seed value readable from the CPU;
   a calculator that generates a key value for verification by executing a specified arithmetic processing on the seed value stored in the seed value storage section;
   a key value storage section to which a key value is written by the CPU; and
   a comparator that compares the key value written to the key value storage section with the key value for verification, wherein
   when the count value equals the timeout value without the counter being reset, in response to the key value written in the key value storage section and the key value for verification matching, the counter is reset and the seed value to be determined at the time of resetting the counter is stored in the seed value storage section, the seed value being established using the count value.

2. The abnormality detection circuit according to claim 1, wherein
   the specified arithmetic processing performed by the calculator is such that a mapping between a seed value set of possible values as the seed values and a key value set of possible values as the key values for verification is a bijection.

3. The abnormality detection circuit according to claim 2, wherein
   the specified arithmetic processing performed by the calculator comprises bit swapping.

4. The abnormality detection circuit according to claim 2, wherein
   a count value at the time of resetting the counter is stored in the seed value storage section as the seed value.

5. The abnormality detection circuit according to claim 2, further comprising a free counter that is not reset even if the key value written to the key value storage section and the key value for verification match, wherein a count value of the free counter at the time of resetting the counter is stored in the seed value storage section as the seed value.

6. The abnormality detection circuit according to claim 2, further comprising a random number generator, wherein
a random number generated by the random number generator at the time of resetting the counter is stored in the seed value storage section as the seed value.

7. The abnormality detection circuit according to claim 2, wherein
the seed value storage section receives and stores the seed value from an external source when the counter is reset.

8. The abnormality detection circuit according to claim 1, wherein
when the key value written to the key value storage section and the key value for verification do not match, the counter is not reset and continues counting.

9. The abnormality detection circuit according to claim 2, wherein
when the key value written to the key value storage section and the key value for verification do not match, the counter is not reset and continues counting.

10. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU; and
a comparator that compares the key value written to the key value storage section with the key value for verification, wherein
when the count value equals the timeout value without the counter being reset, in response to the key value written in the key value storage section and the key value for verification matching, the counter is reset and the seed value to be determined at the time of resetting the counter is stored in the seed value storage section, and
the specified arithmetic processing performed by the calculator comprises bit swapping.

11. The abnormality detection circuit according to claim 10, wherein
a count value at the time of resetting the counter is stored in the seed value storage section as the seed value.

12. The abnormality detection circuit according to claim 10, further comprising a free counter that is not reset even if the key value written to the key value storage section and the key value for verification match, wherein
a count value of the free counter at the time of resetting the counter is stored in the seed value storage section as the seed value.

13. The abnormality detection circuit according to claim 10, further comprising a random number generator, wherein
a random number generated by the random number generator at the time of resetting the counter is stored in the seed value storage section as the seed value.

14. The abnormality detection circuit according to claim 10, wherein
the seed value storage section receives and stores the seed value from an external source when the counter is reset.

15. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU; and
a comparator that compares the key value written to the key value storage section with the key value for verification, wherein
when the count value equals the timeout value without the counter being reset, in response to the key value written in the key value storage section and the key value for verification matching, the counter is reset and the seed value to be determined at the time of resetting the counter is stored in the seed value storage section, and
a count value at the time of resetting the counter is stored in the seed value storage section as the seed value.

16. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU;
a comparator that compares the key value written to the key value storage section with the key value for verification; and
a free counter that is not reset even if the key value written to the key value storage section and the key value for verification match, wherein
when the count value equals the timeout value without the counter being reset, in response to the key value written in the key value storage section and the key value for verification matching, the counter is reset and the seed value to be determined at the time of resetting the counter is stored in the seed value storage section, and
a count value of the free counter at the time of resetting the counter is stored in the seed value storage section as the seed value.

17. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU;
a comparator that compares the key value written to the key value storage section with the key value for verification; and
a random number generator, wherein
when the count value equals the timeout value without the counter being reset, in response to the key value written in the key value storage section and the key value for verification matching, the counter is reset and the seed value to be determined at the time of resetting the counter is stored in the seed value storage section, and a random number generated by the random number generator at the time of resetting the counter is stored in the seed value storage section as the seed value.

18. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU; and
a comparator that compares the key value written to the key value storage section with the key value for verification, wherein
when the count value equals the timeout value without the counter being reset, in response to the key value written in the key value storage section and the key value for verification matching, the counter is reset and the seed value to be determined at the time of resetting the counter is stored in the seed value storage section, and
the seed value storage section receives and stores the seed value from an external source when the counter is reset.

19. A microcomputer comprising:
the abnormality detection circuit according to claim 1; and
the CPU.

20. An abnormality detection method of detecting an abnormality in a CPU comprising:
counting a count value from an initial value to a timeout value;
storing a seed value readable from the CPU;
generating a key value for verification by performing a specified arithmetic processing on the seed value;
waiting for a key value to be written by the CPU;
comparing the key value written by the CPU with the key value for verification; and
when the count value equals the timeout value without the counter value being reset, in response to the key value and the key value for verification matching, resetting the counter and storing the seed value to be determined at the time of resetting, the seed value being established using the count value.

21. An abnormality detection circuit that detects an abnormality of a CPU, comprising:
a counter that counts a count value from an initial value to a timeout value;
a seed value storage section that stores a seed value readable from the CPU;
a calculator that generates a key value for verification by executing a specified arithmetic processing on the seed value stored in the seed value storage section;
a key value storage section to which a key value is written by the CPU; and
a comparator that compares the key value written to the key value storage section with the key value for verification; wherein
when the count value equals the timeout value without the counter being reset, in response to the key value written in the key value storage section and the key value for verification matching, the counter is reset and the seed value to be determined at the time of resetting the counter is stored in the seed value storage section, and
the specified arithmetic processing performed by the calculator is such that a mapping between a seed value set of possible values as the seed values and a key value set of possible values as the key values for verification is a bijection.

* * * * *